United States Patent
Booth et al.

(10) Patent No.: US 12,254,134 B2
(45) Date of Patent: Mar. 18, 2025

(54) METHOD FOR GENERATING FEEDBACK IN A MULTIMEDIA ENTERTAINMENT SYSTEM

(71) Applicant: Sony Interactive Entertainment Europe Limited, London (GB)

(72) Inventors: John Booth, London (GB); Mandana Jenabzadeh, London (GB); Alan Suganuma Murphy, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 18/165,997

(22) Filed: Feb. 8, 2023

(65) Prior Publication Data
US 2023/0251718 A1 Aug. 10, 2023

(30) Foreign Application Priority Data
Feb. 8, 2022 (GB) ...................................... 2201582

(51) Int. Cl.
 *G06F 3/038* (2013.01)
 *A63F 13/285* (2014.01)
 *G06F 3/01* (2006.01)

(52) U.S. Cl.
 CPC ............ *G06F 3/016* (2013.01); *A63F 13/285* (2014.09)

(58) Field of Classification Search
 CPC ...... G06F 3/016; G06F 3/0338; G06F 3/0383; G06F 3/038; A63F 13/285; A63F 13/50; A63F 13/53; A63F 13/28; A63F 13/54
 See application file for complete search history.

(56) References Cited

U.S. PATENT DOCUMENTS

| 10,951,951 B2 | 3/2021 | Osman | |
| 2008/0227546 A1* | 9/2008 | Roberts | A63F 13/24 463/40 |
| 2014/0347177 A1* | 11/2014 | Phan | A63F 13/285 340/407.1 |
| 2017/0203207 A1* | 7/2017 | Lacroix | G06F 3/016 |
| 2018/0117460 A1* | 5/2018 | Townley | G06F 13/102 |
| 2018/0318711 A1* | 11/2018 | Hunt | G09G 5/12 |
| 2020/0012347 A1 | 1/2020 | Wu et al. | |
| 2020/0054940 A1* | 2/2020 | Andall | G06F 3/038 |
| 2020/0238166 A1* | 7/2020 | Munson | G06F 3/038 |

(Continued)

FOREIGN PATENT DOCUMENTS

EP 3417920 A1 12/2018

OTHER PUBLICATIONS

Combined Search and Examination Report for British Application No. GB2201582.0 mailed Nov. 24, 2022, pp. 1-10.

(Continued)

*Primary Examiner* — Temesghen Ghebretinsae
*Assistant Examiner* — Sosina Abebe
(74) *Attorney, Agent, or Firm* — Lerner David LLP

(57) ABSTRACT

A method for generating feedback in a multimedia entertainment system, the method comprising: obtaining an output stream to be output by the multimedia entertainment system; performing feature analysis to identify a feature in the output stream; determining a feedback based on the identified feature; controlling a main audiovisual display to output the output stream; and controlling a peripheral device to output the determined feedback.

13 Claims, 7 Drawing Sheets

(56) References Cited

U.S. PATENT DOCUMENTS

2020/0238167 A1*  7/2020  Downs .................... A63F 13/26
2021/0344786 A1* 11/2021  Takura ............ H04M 1/724092
2022/0305375 A1*  9/2022  Morita .................... A63F 13/24

OTHER PUBLICATIONS

Extended European Search Report including Written Opinion for Application No. 23155687.9 dated Jun. 6, 2023, pp. 1-9.

* cited by examiner

METHOD FOR GENERATING FEEDBACK IN A MULTIMEDIA ENTERTAINMENT SYSTEM

CROSS-REFERENCE TO RELATED APPLICATIONS

The present application claims priority from United Kingdom Patent Application No. 2201582.0, filed Feb. 8, 2022, the disclosure of which is hereby incorporated herein by reference.

TECHNICAL FIELD

The following disclosure relates to methods for generating feedback in a multimedia entertainment system, such as a home cinema or a gaming system. Computer programs, systems and devices implementing the methods are also described.

BACKGROUND

Feedback in a multimedia entertainment system can be used to enhance a multimedia entertainment experience, for example by providing haptic feedback via a game controller, where the haptic feedback is synchronized to an event occurring in a game.
For example, the PlayStation 5 has a controller called the DualSense. This controller is capable of providing feedback and stimulation to the player in the following ways:
  Haptic feedback and resistive triggers—allowing players to experience vibration, simulations of texture and sensations of resistance or pressure
  Visual feedback—DualSense (and prior to this DualShock 4) controllers contain a light source capable of changing colour depending on the game being played. For instance, in one game, the DualShock 4 light flashed red and blue simulating police lights when a character was being chased by police.
  Audio feedback—DualSense (and prior to this DualShock 4) contain speakers capable of mirroring in game sound, or creating sound that uniquely emits from the controller to enhance immersion. For instance, in another game, the DualSense speaker emits the sound of hail hitting metal to enhance the audio that is being simultaneously created by the game and emitted from the TV speaker.
  However, in known implementations, the feedback has to be programmed as part of a game. For example, the game can be programmed to trigger feedback in relation to a specific gameplay action, or at a specific time in a linear cut scene.
Accordingly, it is desirable to provide a more flexible way of incorporating feedback into a multimedia experience provided by a multimedia entertainment system having one or more peripheral devices.

SUMMARY

According to a first aspect, there is provided a method for generating feedback in a multimedia entertainment system, the method comprising: obtaining an output stream to be output by the multimedia entertainment system; performing feature analysis to identify a feature in the output stream; determining a feedback based on the identified feature; controlling a main audiovisual display to output the output stream; and controlling a peripheral device to output the determined feedback.

According to a second aspect, there is provided a method for generating feedback for a multimedia entertainment system, the method comprising: obtaining an output stream to be output by the multimedia entertainment system; performing feature analysis to identify a feature in the obtained output stream; determining a feedback based on the identified feature; and embedding the determined feedback with the output stream.

The methods of the first and second aspect solve the above-identified problem by providing a way to automatically generate feedback to be included with a multimedia experience.

Either of the methods of the first and second aspect may include the following optional features:

The identified feature has a first sensory type and the feedback has a second sensory type different from the first sensory type. This can enable assistance for users with an impaired perception of the first sensory type. For example, where a user has a hearing impairment, they may benefit from the first sensory type being audio and the second sensory type being visual.

The feedback comprises a haptic feedback. This enhances the possible range of multimedia experiences beyond audio and video.

The feedback comprises a combination of at least two sensory types. This increases the flexibility and range of possible feedbacks.

The step of controlling a peripheral device further comprises controlling at least one additional peripheral device to output at least a part of the determined feedback. This again increases the flexibility and range of possible feedbacks.

The feature analysis comprises identifying an instantaneous feature or identifying an event comprising a sequence of instantaneous features. Using feature sequences further enhances the flexibility of the feedback which can be added.

The method further comprises: determining a first time position of the identified feature; and controlling a time offset between the first time position and a second time position of the feedback. By controlling a time offset, the feedback can be output for a user before, during or after the identified feature of the output stream. The time offset may further be based on the identified feature, such that the feedback can be timed suitably for different features.

According to a third aspect, there is provided a base unit configured to perform a method according to the first or second aspect, and configured to control a main audiovisual display and a peripheral device.

According to a fourth aspect, there is provided a computer program comprising instructions which, when executed by a base unit of a multimedia entertainment system, cause the base unit to perform a method according to the first or second aspect.

According to a fifth aspect, there is provided a non-transitory storage medium storing instructions which, when executed by a base unit of a multimedia entertainment system, cause the base unit to perform a method according to the first or second aspect.

According to a sixth aspect, there is provided a signal storing instructions which, when executed by a base unit of a multimedia entertainment system, cause the base unit to perform a method according to the first or second aspect.

According to a seventh aspect, there is provided a multimedia entertainment system comprising: a remote server; a local base unit connected to the remote server via a network;

and a main audiovisual display and a peripheral device connected to the local base unit, wherein the server is configured to perform a method for generating feedback according to the second aspect and to stream the output stream with the embedded feedback to the local base unit, and the local base unit is configured to control the main audiovisual display to output the output stream and to control the peripheral device to output the embedded feedback.

DETAILED DESCRIPTION

Figure 1A:
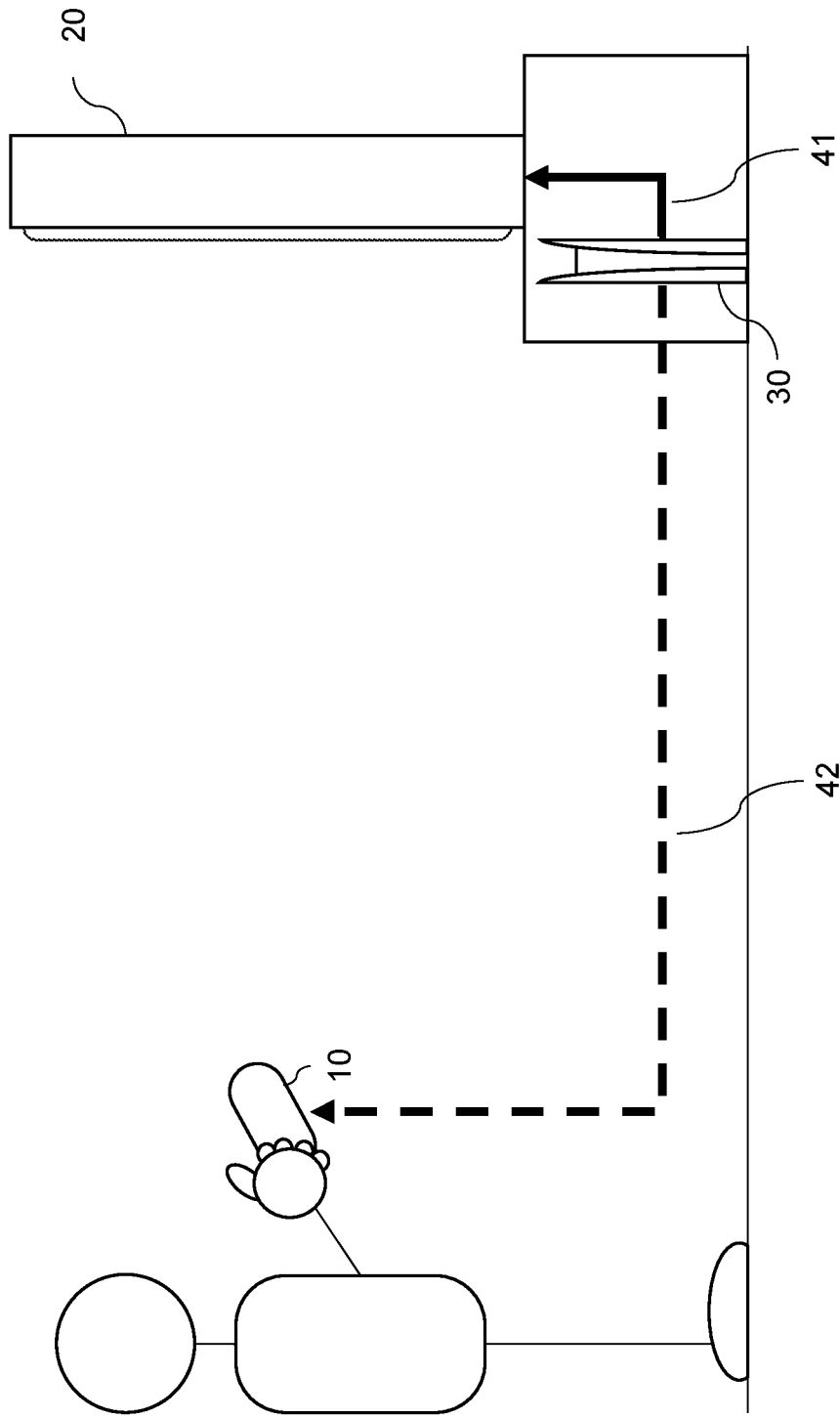
FIG. 1A is a schematic diagram of a multimedia entertainment system in which a method according to the invention may be implemented, including a peripheral device.

FIG. 1A is a schematic diagram of a multimedia entertainment system in which a method according to the invention may be implemented.

As shown in FIG. 1A, the multimedia entertainment system may comprise a peripheral device 10, a main audiovisual display 20, and a base unit 30.

The peripheral device 10 may, for example, be a handheld controller, a companion touchscreen interface, an audio headset or audiovisual headset (e.g. VR or AR headsets), a mobile phone, a wearable device, an external speaker or soundbar, or a peripheral lighting element. The multimedia entertainment system may comprise multiple peripheral devices 10, such as one controller per player of a game.

The main audiovisual display 20 may, for example, be a television, a home cinema system, or a projector.

The base unit 30 is a device configured to control the main audiovisual display to output an output stream 41 and configured to control the peripheral device 10 to output feedback 42. The base unit 30 communicates with the peripheral device 10 and main audiovisual display 20 via respective wired or wireless connections. Additionally, in some implementations, the main audiovisual display 20 and the base unit 30 may be combined in a single device.

The output stream 41 is any multimedia stream comprising audio and/or video. For example, the base unit 30 may be a gaming system, a multimedia streaming receiver, a DVD player, and the output stream 41 may be obtained from a game, movie or other multimedia source.

Figure 1B:
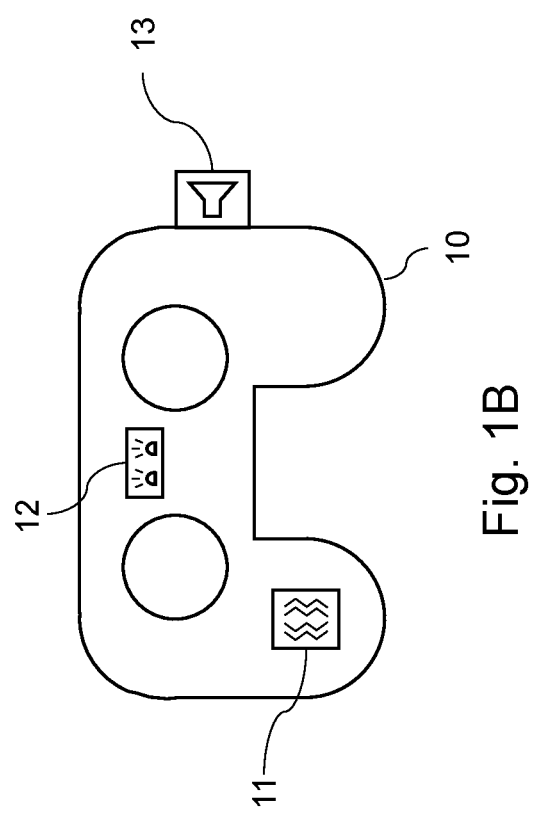
FIG. 1B is a schematic diagram of the peripheral device.

The feedback 42 is one or more additional sensory outputs provided from the peripheral device 10 to enhance the experience of the output stream. Here, feedback does not necessarily take an expected meaning of a response to a user or a modification of the output stream. Referring to FIG. 1B, the feedback 42 may include haptic feedback such as control of a vibration element 11 mounted on the peripheral device 10, resistive or motorised triggers, visual feedback such as control of an LED display 12 mounted on the peripheral device 10, and/or audio feedback such as control of a speaker 13 mounted on the peripheral device 10. The feedback 42 can also be output through multiple different peripherals, each implementing one or more of the types of sensory output exemplified above. As mentioned above, such sensory outputs have previously been used to increase immersion in a game. However, similar "feedback" can be provided to accompany and enhance more linear media such as films. The feedback is determined based on a feature in the output stream, such that the feedback is related to the main content output by the main audiovisual display. Furthermore, a mixture of different sensory outputs can be combined in dependence on the output main content and delivered to the user through one or more peripheral devices. For example, a feedback signal comprising a mixture of haptics, light effects (through LEDs and the like) and audio can be generated in dependence on the main content and can be output through one or more peripheral devices. The peripheral device(s) can be in immediate vicinity of the user, located remotely from the user or (in the case of multiple such devices) spread across a wide area to provide an enhanced immersive experience. In the case that multiple peripheral devices are used, each peripheral device can comprise a means for wired or wireless communication with each other. In one example, one or more of the multiple peripheral devices comprises a transceiver unit configured to receive an output feedback signal and distribute separate signals to at least one other of the multiple peripheral devices.

Figure 2:
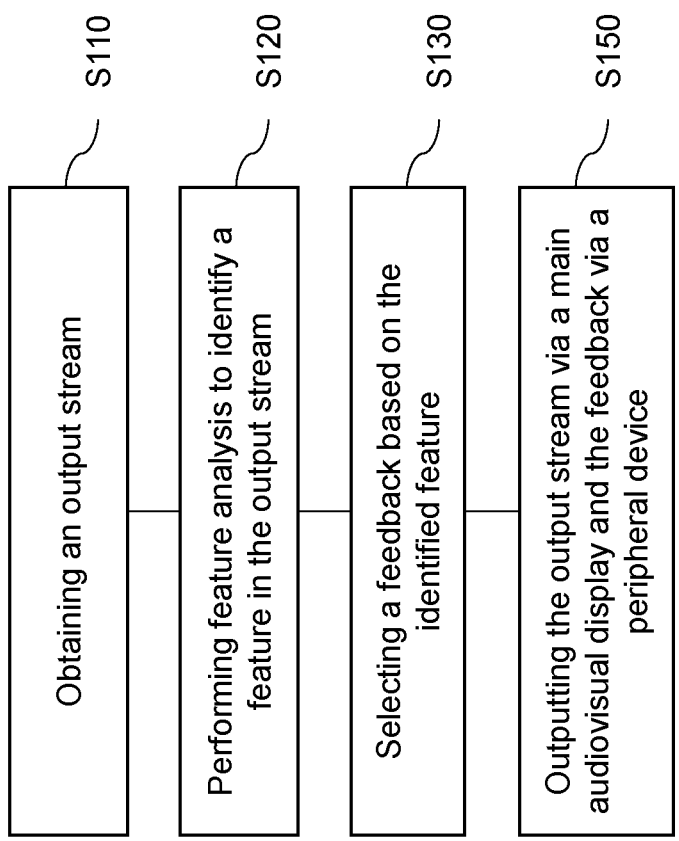
FIG. 2 is a flow chart schematically illustrating steps of a method according to the invention.

FIG. 2 is a flow chart schematically illustrating steps of a method according to the invention.

At step S110, the base unit 30 obtains an output stream 41 to be output by the multimedia entertainment system. The output stream may for example comprise content from a game, movie or other multimedia source. Such multimedia can include, for example, voice, audio, music, video, or haptic signals.

At step S120, the base unit 30 performs feature analysis to identify a feature in the output stream. Feature analysis can generally be performed using a combination of known techniques such as edge detection, motion detection, and analysis of 2-dimensional or 3-dimensional information about the to-be-displayed content in the stream. As one example, audio techniques such as applying low-pass filters and isolating low frequency effects (LFE) channels can provide coarse features generated from an output audio signal. As another example, coarse graphical filters or Gaussian sampling can be used to generate features from an output video signal. Feature analysis of different signals within the multimedia can be combined to isolate and/or identify more complex features. In some embodiments, feature analysis can be combined with sentiment analysis. For example, a moment associated with an "excited" sentiment could trigger haptic feedback simulating a throbbing heartbeat.

Feature analysis avoids the need to embed feedback triggers as part of the output stream, which has previously been performed manually.

At step S130, the base unit 30 determines (e.g. generates or selects) a feedback based on the identified feature. In one implementation, the base unit 30 may store a mapping relationship between a set of possible features and one or more feedback selections corresponding to each feature. The mapping relationship may be predetermined manually or through automated techniques such as machine learning. The feedback can comprise one or more sensory effects such as haptics, lighting effects and audio. That is, the feedback can comprise two or more different sensory types.

At step S150, the base unit 30 communicates with the main audiovisual display 20 and the peripheral device 10, to control the main audiovisual display 20 to output the output stream 41 and to control the peripheral device 10 to output the selected feedback 42.

In some embodiments, the method is applied for improving accessibility. More specifically, the feature identified in step S120 may have a first sensory type (e.g. visual or audio), and the feedback selected in step S130 may have a second sensory type different from the first sensory type, in order to enhance the experience for a user with reduced ability to perceive the first sensory type.

In one example, where the method is used to improve accessibility for the hearing impaired, at step S120, an audio component of the output stream may be analysed to identify audio features such as sudden loud noises (e.g. explosions). Then, at step S130, the selected feedback may include a visual or haptic effect corresponding to the sound feature, to be output from the peripheral device 10.

In some examples there can be a sub-step of receiving an input from the user of sensory types preferred for the user. Conversely the sub-step can be receiving an input from the user of undesired sensory types. For example a user hard of hearing can input 'audio' as an unpreferred sensory type. With such an input received, the method can be carried out to specifically re-map audio feedback to other sensory types such as visual and haptic feedback. In some examples, such unpreferable sensory types can be automatically detected. For example, as the user plays a game, the system can learn and recognize certain sensory types to which the user appears to be unresponsive (or less responsive). The feedback determined at step S130 can then be biased away from such sensory types.

In another example, where the method is used to improve accessibility for the visually impaired in a game, a visual component of the output stream may be analysed to identify a more subtle visual feature such as a type of terrain in a game (e.g. road, grass, rocky). Then, at step S130, the selected feedback may include a haptic effect corresponding to the type of terrain.

In some embodiments, the feedback may be selected in step S130 based on an event comprising a sequence of instantaneous features. For example, a strobe lighting effect may be identified based on a sequence of sudden lighting change features. The strobe lighting effect may be treated as a single event, and the base unit 30 may make a feedback selection in response to the event. For example, the feedback may comprise a warning output from the peripheral device 10 before the identified event is output from the main audiovisual display 20.

In some cases, such as the above mentioned strobe lighting, it is desirable to control a time offset between a first time position when the feature identified in step S120 is output by the main audiovisual display 20 and a second time position when the selected feedback is output by the peripheral device 10.

Figure 3:
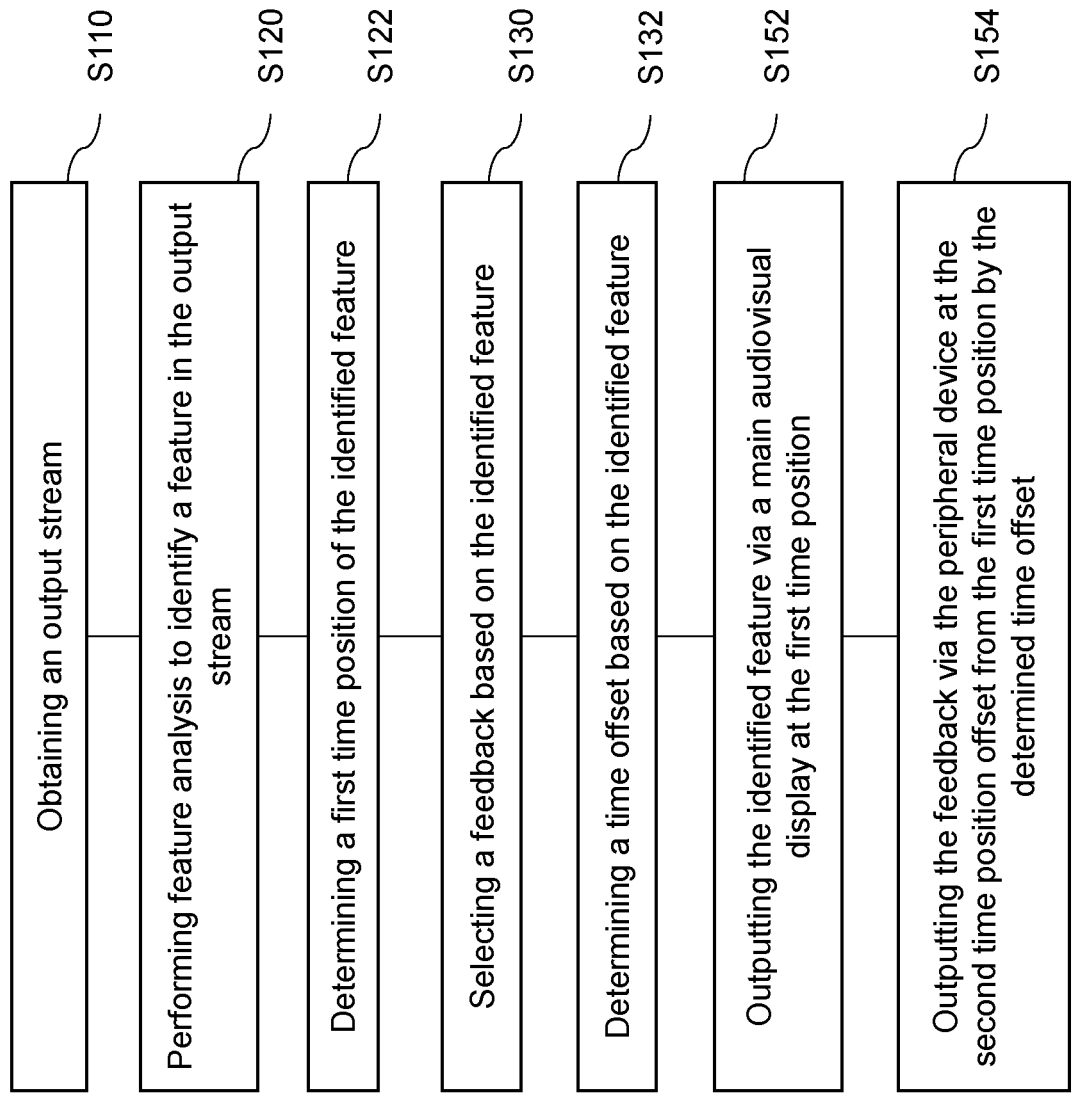
FIG. 3 is a flow chart schematically illustrating steps of an implementation of the method.

FIG. 3 is a flow chart schematically illustrating some additional steps of an implementation which provides control of a time offset. Steps S110, S120 and S130 are the same as previously described, the remaining steps S122, S132, S152 and S154 are described below.

At step S122, after identifying a feature in the output stream, the base unit 30 determines a first time position of the identified feature within the output stream. In one implementation, the output stream may include time stamps, and the base unit 30 may identify the first time position based on a nearest time stamp in the output stream. In another implementation, where the output stream does not include time stamps, the base unit 30 may count time in the output stream based on units of the stream, such as video frames, and the base unit 30 may identify the first time position as a number of units from a starting point of the output stream.

At step S132, before or after selecting the feedback at step S130, the base unit 30 determines a time offset based on the identified feature. For example, in the accessibility examples, the assistive feedback (e.g. a visual indicator of a loud noise) should be simultaneous with the identified feature (e.g. explosion audio) when both are output, and the time offset is 0. In some cases, such as the strobe lighting example, the feedback is desirably output before the corresponding feature of the output stream, and the time offset is negative. In other cases, the time offset may be positive.

Step S132 may be omitted in some embodiments where the time offset is predetermined, regardless of the identified feature.

At step S152 (which forms part of step S150), the base unit 30 controls the main audiovisual display 20 to output the identified feature at the first time position. This does not require any modification of the output stream, as the first time position was already determined from the output stream at step S122.

At step S154 (which also forms part of step S150), the base unit 30 controls the peripheral device 10 to output the selected feedback at a second time position, which is offset from the first time position by the time offset.

Figure 4:
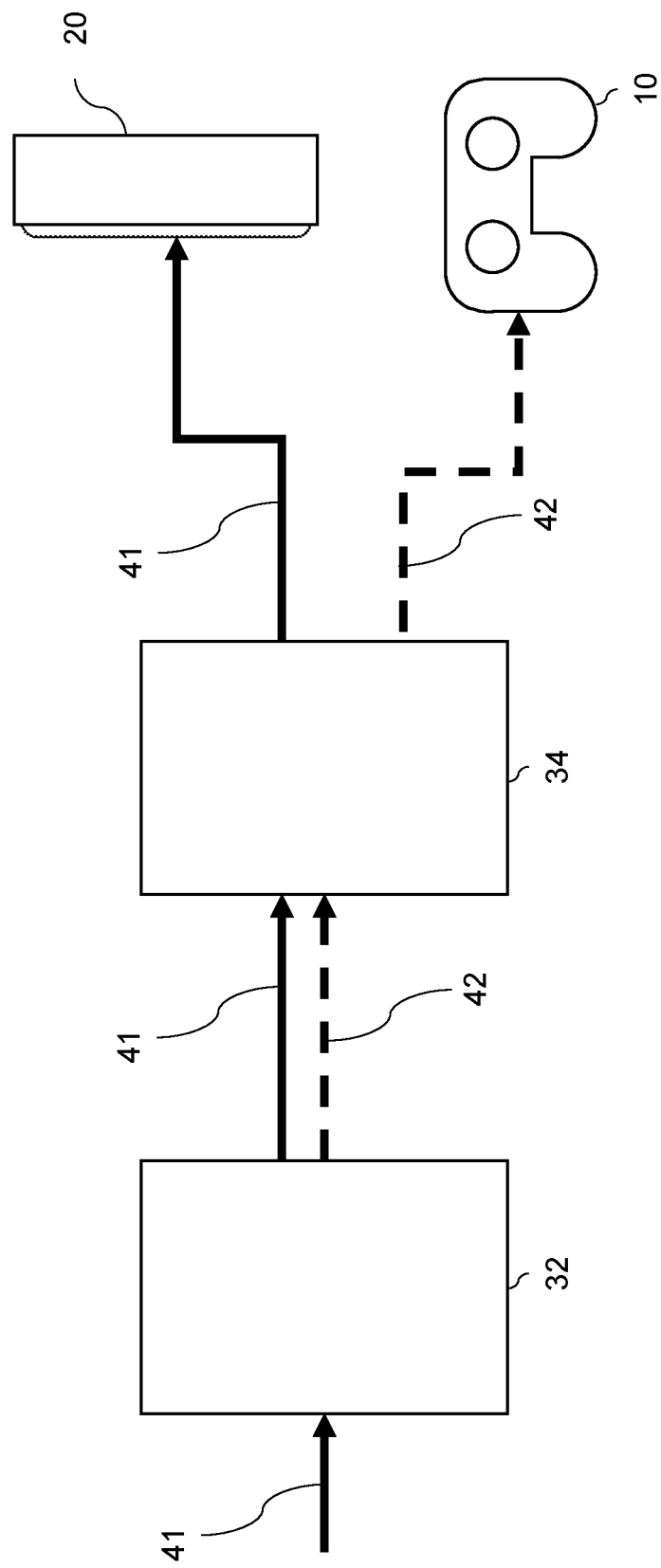
FIG. 4 is a schematic diagram of a multimedia entertainment system in a distributed implementation of the invention.

FIG. 4 is a schematic diagram of a multimedia entertainment system in a distributed implementation of the invention, where a device generating the feedback 42 can be separated from a user's local setup having the main audiovisual display 20 and the peripheral device 10.

As shown in FIG. 4, the multimedia entertainment system may comprise a feedback generator 32 and an output controller 34. The feedback generator 32 and the output controller 34 may be hardware or software modules of the base unit 30. Alternatively, the feedback generator 32 may be located remotely from the output controller 34. For example, the feedback generator 32 may be implemented in a server or a cloud processing system.

Figure 5:
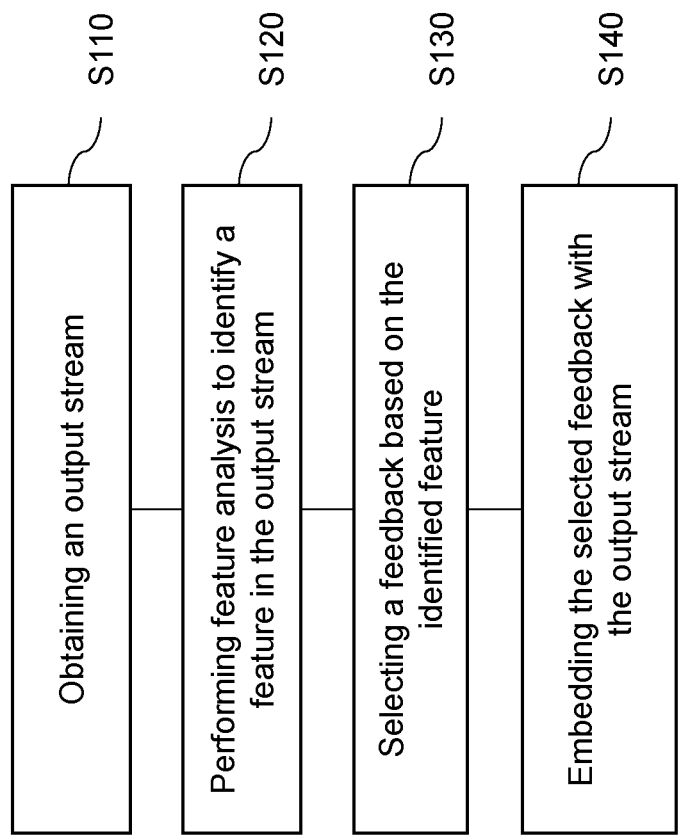
FIG. 5 is a flow chart schematically illustrating steps of a method according to the distributed implementation.

FIG. 5 is a flow chart schematically illustrating steps of a method according to the distributed implementation and performed by the feedback generator 32.

Steps S110, S120 and S130 are the same as described above with reference to FIG. 2.

Then, at step S140, the feedback generator 32 generates an enhanced output stream in which the feedback 42 is embedded with the original output stream 41. This enhanced output stream can then be transmitted as a combined signal to the output controller 34.

On the other hand, the output controller 34 is configured to receive the enhanced output stream, and perform the above described step S150 to control the main audiovisual display 20 and the peripheral device 10 to output the output stream 41 and the feedback 42 respectively.

The distributed implementation of FIGS. 4 and 5 may be preferred in some circumstances, but less useful in other circumstances.

For example, if the output stream 41 contains a static medium such as a pre-recorded movie, then feedback generation can be performed once by a feedback generator 32, and the output stream 41 and feedback 42 can be distributed together to multiple users' local setups, each having a respective output controller 34.

On the other hand, when the output stream 41 contains individually-generated content such as a game interface for a game running in the base unit 30, then there may be no advantage to embedding the feedback 42 with the output stream 41.

In some implementations, the base unit 30 comprises a feedback generator 32 to be used in some cases (such as individually-generated content), but is also configured to receive an enhanced output stream which can be directly received by the output controller 34 without being processed by the feedback generator 32.

Figure 6:
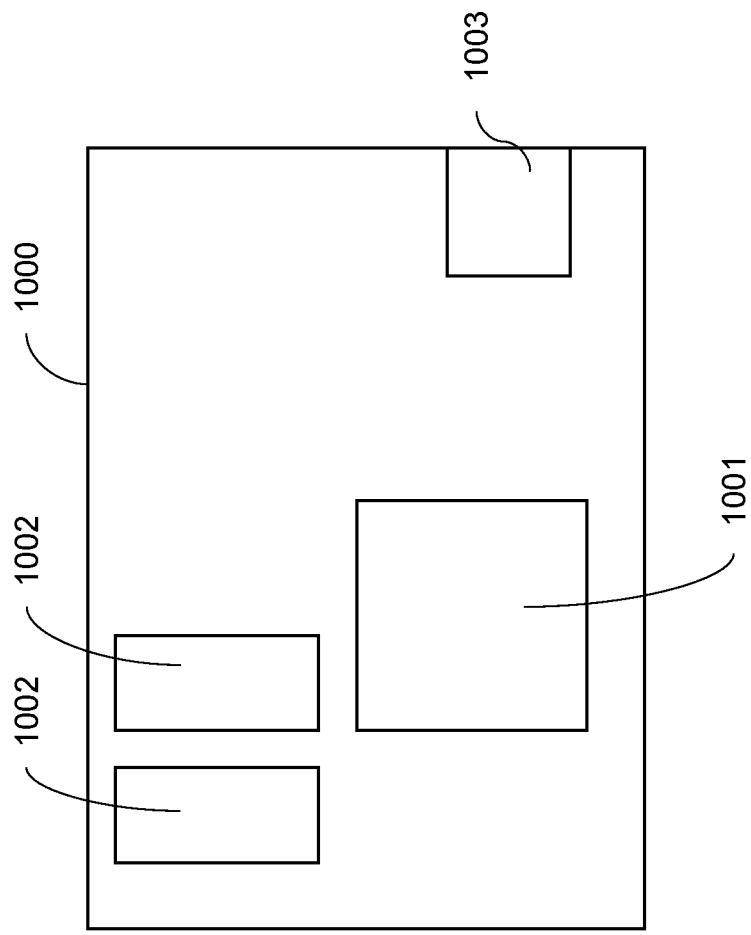
FIG. 6 is a schematic block diagram of a computer configured to implement a method according to the invention.

FIG. 6 is a schematic block diagram of a computer configured to implement a method according to the invention. The features of FIG. 6 may appear in the peripheral device 10, the base unit 30, the feedback generator 32 and/or the output controller 34.

Referring to FIG. 6, the computer 1000 comprises a processor 1001, at least one memory 1002, and an input/output interface 1003. The processor 1001 may execute instructions stored in the memory 1002 in order to perform a part of one of the above-described methods for generating feedback in a multimedia entertainment system.

The invention claimed is:

1. A method for generating feedback in a multimedia entertainment system, the method comprising:
    obtaining an output stream to be output by the multimedia entertainment system;
    performing feature analysis to identify a feature in the output stream;
    determining a first time position of the identified feature;
    selecting a visual feedback to be output by a peripheral device based on the identified feature;
    determining a time offset between outputting the visual feedback and the output stream based on the identified feature;
    controlling a main audiovisual display to output the output stream at the first time position; and
    controlling the peripheral device to output the visual feedback at a second time position offset from the first time position based on the time offset.

2. The method according to claim 1, wherein the identified feature has a first sensory type and the visual feedback has a second sensory type different from the first sensory type.

3. The method according to claim 2, wherein the first sensory type is audio and the second sensory type is visual.

4. The method according to claim 1, further comprising:
    selecting a haptic feedback to be output by the peripheral device based on the identified feature; and
    controlling the peripheral device to output the haptic feedback.

5. The method according to claim 1, wherein the visual feedback further comprises at least one other sensory type.

6. The method according to claim 1, wherein controlling the peripheral device further comprises controlling at least one additional peripheral device to output at least a part of the visual feedback.

7. The method according to claim 1, wherein the feature analysis comprises identifying an instantaneous feature or identifying an event comprising a sequence of instantaneous features.

8. A base unit of a multimedia entertainment system, wherein the base unit is configured to control a main audiovisual display and a peripheral device, and the base unit is configured to perform the method according to claim 1.

9. A computer program comprising instructions which, when executed by a base unit of a multimedia entertainment system, cause the base unit to perform the method according to claim 1.

10. A non-transitory storage medium storing instructions which, when executed by a base unit of a multimedia entertainment system, cause the base unit to perform the method according to claim 1.

11. A signal storing instructions which, when executed by a base unit of a multimedia entertainment system, cause the base unit to perform the method according to claim 1.

12. A method for generating feedback for a multimedia entertainment system, the method comprising:
    obtaining an output stream to be output by the multimedia entertainment system;
    performing feature analysis to identify a feature in the obtained output stream;
    determining a first time position of the identified feature;
    selecting a visual feedback based on the identified feature;
    determining a time offset for outputting the visual feedback within the output stream based on the identified feature;
    embedding the visual feedback with the output stream; and
    outputting the embedded visual feedback at a second time position offset from the first time position based on the time offset.

13. A multimedia entertainment system comprising:
    a remote server;
    a local base unit connected to the remote server via a network; and
    a main audiovisual display and a peripheral device connected to the local base unit,
    wherein the server is configured to perform a method for generating feedback according to claim 12 and to stream the output stream with the embedded visual feedback to the local base unit, and
    the local base unit is configured to control the main audiovisual display to output the output stream and to control the peripheral device to output the embedded visual feedback.

* * * * *